United States Patent
Kobayashi et al.

[11] Patent Number: 5,969,039
[45] Date of Patent: Oct. 19, 1999

[54] PROCESS FOR THE PREPARATION OF CURED SILICONE POWDER

[75] Inventors: Kazuo Kobayashi; Ryuji Tachibana; Yoshitsugu Morita, all of Chiba Prefecture, Japan

[73] Assignee: Dow Corning Toray Silicone Co., LTD., Tokyo, Japan

[21] Appl. No.: 09/063,569

[22] Filed: Apr. 21, 1998

[30] Foreign Application Priority Data

Apr. 30, 1997 [JP] Japan .................................. 9-126377

[51] Int. Cl.$^6$ ................................................ G08G 77/08
[52] U.S. Cl. ............................ 524/837; 528/15; 525/478
[58] Field of Search ........................... 524/837; 525/478; 528/15

[56] References Cited

U.S. PATENT DOCUMENTS

| | | | |
|---|---|---|---|
| 4,742,142 | 5/1988 | Shimizu et al. | 528/15 |
| 4,743,670 | 5/1988 | Yoshida et al. | 528/15 |
| 4,761,454 | 8/1988 | Oba et al. | 524/862 |
| 5,028,653 | 7/1991 | Desmonceau et al. | 524/462 |
| 5,538,793 | 7/1996 | Inokuchi et al. | 428/407 |
| 5,741,439 | 4/1998 | Armstrong et al. | 252/312 |

*Primary Examiner*—Margaret G. Moore
*Attorney, Agent, or Firm*—James L. De Cesare

[57] ABSTRACT

A highly productive process for preparing cured silicone powder having a uniform particle size, in which a platinum-alkenylsilozane complex catalyst is added to a water-based dispersion of a silicone composition. The silicone composition is (i) an organopolysiloxane having at least two silicon-bonded alkenyl groups in each molecule, and (ii) an organopolysiloxane having at least two silicon-bonded hydrogen atoms in each molecule. The catalyst is added and dispersed in the form of liquid particles with an average particle size in volumetric particle size distribution in water of no more than one micron.

5 Claims, No Drawings

PROCESS FOR THE PREPARATION OF CURED SILICONE POWDER

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to a process for preparing cured silicone powders. More particularly, the invention relates to a high-productivity process for preparing cured silicone powder having a uniform particle size.

BACKGROUND OF THE INVENTION

It is known that cured silicone powder can be prepared by curing liquid particles of a curable silicone composition comprising a platinum catalyst, an organopolysiloxane having at least two silicon-bonded alkenyl groups in each molecule, and an organopolysiloxane having at least two silicon-bonded hydrogen atoms in each molecule.

For example, Japanese Patent Application Laid Open (Kokai or Unexamined) Number Sho 62-243621 (243,621/1987)/U.S. Pat. No. 4,742,142, teaches a process in which (i) a curable silicone composition comprising a platinum catalyst, an organopolysiloxane having at least two silicon-bonded alkenyl groups in each molecule, and an organopolysiloxane having at least two silicon-bonded hydrogen atoms in each molecule, is emulsified using water and a surfactant; and (ii) the curable silicone composition dispersed in liquid particle form in this emulsion is then cured by dispersing the emulsion in hot water.

In another example, Japanese Patent Application Laid Open (Kokai or Unexamined) Number Sho 62-257939 (257,939/1987)/U.S. Pat. No. 4,761,454, teaches a process in which (i) an organopolysiloxane having at least two silicon-bonded alkenyl groups in each molecule, and an organopolysiloxane having at least two silicon-bonded hydrogen atoms in each molecule, are emulsified using water and a surfactant; (ii) a platinum catalyst is added to the emulsion; and (iii) the curable silicone composition dispersed in liquid particle form in the emulsion is then cured by heating or spray drying the emulsion.

In the former process, i.e., U.S. Pat. No. 4,742,142, however, curing occurs in the curable silicone composition prior to its homogeneous dispersion in water. This causes problems such as the production of cured silicone powder with a broad particle size distribution, and the presence in the cured silicone powder of a substantial amount of large gel particles.

The latter process, i.e., U.S. Pat. No. 4,761,454, while not suffering from the problems described in U.S. Pat. No. 4,742,142, does require an extended period of time to achieve an acceptable cure, because the rate of incorporation of the platinum catalyst into the organopolysiloxane emulsion is rate-determining for the process. As a result, the process in U.S. Pat. No. 4,761,454 has poor productivity. In addition, since the emulsion breaks during the extended period of time required for curing, problems of a broad particle size distribution and the presence of large gel particles again arise.

BRIEF SUMMARY OF THE INVENTION

The object of this invention, therefore, is to provide a high-productivity process for preparing cured silicone powder having uniform particle size.

Accordingly, in preparing cured silicone powder by the method of this invention, a platinum-alkenylsiloxane complex catalyst is added to a water-based dispersion of a silicone composition containing an organopolysiloxane having at least two silicon-bonded alkenyl groups in each molecule, and an organopolysiloxane having at least two silicon-bonded hydrogen atoms in each molecule. The characterizing feature of the present invention is the presence of the catalyst as a dispersion in the form of liquid particles having an average particle size in their volumetric particle size distribution in water of no greater than 1 $\mu$m (micron/micrometer).

These and other objects of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The process of the present invention commences with the preparation of a water-based dispersion of a silicone composition which contains (i) an organopolysiloxane having at least two silicon-bonded alkenyl groups in each molecule, i.e., the alkenyl-functional organopolysiloxane, and (ii) an organopolysiloxane having at least two silicon-bonded hydrogen atoms in each molecule, i.e., the ≡SiH functional organopolysiloxane.

The alkenyl-functional organopolysiloxane is the base component in the formation of the cured silicone powder. The alkenyl functionality in the organopolysiloxane can be vinyl, allyl, butenyl, and pentenyl, with vinyl being specifically preferred. Non-alkenyl silicon-bonded groups in the organopolysiloxane can be substituted and unsubstituted monovalent hydrocarbon groups, e.g., alkyl groups such as methyl, ethyl, and propyl; aryl groups such as phenyl, tolyl, and xylyl; and haloalkyl groups such as 3,3,3-trifluoropropyl. Methyl and phenyl are preferred. The siloxane can have a straight-chain, partially branched straight-chain, branched-chain, or cyclic molecular structure, with straight-chain and partially branched straight-chain structures being preferred. The alkenyl-functional organopolysiloxane should have a viscosity that permits formation of a water-based dispersion of a silicone composition with the ≡SiH functional organopolysiloxane. For example, a viscosity at 25° C. in the range of from 5 to 10,000,000 centistoke is preferred.

The ≡SiH functional organopolysiloxane is the crosslinking component in forming the cured silicone powder according to this invention. Non-hydrogen silicon-bonded groups present in the ≡SiH functional organopolysiloxane can be substituted and unsubstituted monovalent hydrocarbon groups, e.g., alkyl groups such as methyl, ethyl, and propyl; aryl groups such as phenyl, tolyl, and xylyl; and haloalkyl groups such as 3,3,3-trifluoropropyl. Methyl and phenyl are again preferred. The ≡SiH functional organopolysiloxane can have a straight-chain, partially branched straight-chain, branched-chain, or cyclic molecular structure, with straight-chain and partially branched straight-chain structures being preferred. The ≡SiH functional organopolysiloxane should have a viscosity that permits formation of a water-based dispersion of a silicone composition with the alkenyl-functional organopolysiloxane. For example, a viscosity at 25° C. in the range of from 1 to 10,000,000 centistoke is preferred.

The alkenyl-functional organopolysiloxane to ≡SiH functional organopolysiloxane blending ratio is not critical, but preferably, 0.5 to 5 moles of silicon-bonded hydrogen from the ≡SiH functional organopolysiloxane are provided, per mole of silicon-bonded alkenyl from the alkenyl-functional organopolysiloxane.

The use of a surfactant is preferred for generating a highly stable dispersion of the silicone composition, i.e. the alkenyl-functional organopolysiloxane and the ≡SiH functional organopolysiloxane, in water. Any surfactant that does not impair the curing reaction is suitable. For example, there can be used nonionic surfactants such as polyoxyethylene alkyl ethers and polyoxyethylene alkylphenyl ethers; anionic surfactants such as sodium alkyl sulfates and sodium polyoxyethylene alkyl ether sulfates; or mixtures of two or more of such surfactant types. The surfactant is preferably used at from 0.1 to 10 weight parts per 100 weight parts of the silicone composition. Water is preferably used at from 10 to 200 weight parts per 100 weight parts of the silicone composition.

The technique for dispersing the silicone composition, i.e. the alkenyl-functional organopolysiloxane and the ≡SiH functional organopolysiloxane, in water employs known agitators and mixers such as colloid mills or homogenizers to mix these components.

The next step in the process involves addition of a platinum-alkenylsiloxane complex catalyst to the water-based dispersion of the silicone composition. The catalyst is dispersed in the water-based dispersion of the silicone composition as liquid particles with an average particle size in their volumetric particle size distribution in water of no greater than 1 μm, preferably no greater than 0.8 μm, and most preferably no greater than 0.5 μm. It is preferred that the catalyst have a particle size of no greater than 1 μm, and that it account for at least 40 weight % of the volumetric particle size distribution of catalyst dispersed in liquid particle form in the water of the silicone composition dispersion.

Some suitable platinum-alkenylsiloxane complex catalysts are a platinum-1,3-divinyl-1,1,3,3-tetramethyldisiloxane complex, a platinum-1,3-diallyl-1,1,3,3-tetramethyldisiloxane complex, a platinum-1,3-divinyl-1,3-dimethyl-1,3-diphenyldisiloxane complex, a platinum-1,3-divinyl-1,1,3,3-tetraphenyldisiloxane complex, or a platinum-1,3,5,7-tetramethyl-1,3,5,7-tetravinylcyclotetrasiloxane complex.

The stability of such complexes can be improved by combining the catalyst with an excess of 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinylcyclotetrasiloxane. The platinum complex with an excess of 1,3-divinyl-1,1,3,3-tetramethyldisiloxane is particularly preferred.

The techniques for dispersing the catalyst into liquid particles with an average particle size of no more than 1 μm in their volumetric particle size distribution in water includes (i) addition of a preliminarily prepared water-based catalyst dispersion in which the catalyst is dispersed as liquid particles with an average particle size in their volumetric particle size distribution in water of no more than 1 μm; or (ii) the addition of the catalyst after its dispersion with a surfactant.

The use of a surfactant in technique (i) is also preferred as it improves the stability of the water-based catalyst dispersion. Surfactants which are operative for this purpose are the same surfactants mentioned previously. In techniques (i) and (ii), the surfactant is preferably used in an amount in the range of from 0.01 to 1,000 weight parts per 100 weight parts of the catalyst.

In addition to techniques (i) and (ii), and to induce a uniform dispersion of the catalyst in water, a third technique (iii) can be used in which a water-based dispersion of the catalyst as relatively finer liquid particles is prepared by first dissolving or dispersing the catalyst in a water-soluble organic solvent, and then introducing the resulting solution or dispersion into water.

Water-soluble organic solvents suitable for this purpose are alcohols having no more than four carbon atoms, such as methanol, ethanol, n-propanol, isopropanol, and tert-butanol; and ketones such as acetone and methyl ethyl ketone. The lower alcohols are preferred. Actual preparation of the water-based dispersion of the catalyst can be carried out by mixing the components using known stirrers and mixers such as colloid mills or homogenizers. A surfactant can also be used in technique (iii), and surfactants previously mentioned are suitable.

The quantity of catalyst used is not critical, however, it should be added in an amount sufficient to provide from 0.1 to 1,000 weight ppm of platinum metal in the silicone composition. A preferred amount is from 0.1 to 500 weight ppm of platinum metal, while the most preferred amount is 1 to 50 weight ppm platinum metal, respectively, in the silicone composition.

The curing reaction of the components of the silicone composition, i.e., the alkenyl-functional organopolysiloxane and the ≡SiH functional organopolysiloxane, will begin once the catalyst has been added to the water-based dispersion of the silicone composition. A curing reaction will proceed at temperatures from 0 to 100° C., but excessively low temperatures result in a slow curing reaction, while excessively high temperatures impair the stability of the water-based silicone composition dispersion. The preferred temperature range is therefore from 5 to 70° C.

EXAMPLES

The process for preparing cured silicone powder is explained in more detail in the following examples. In these examples, viscosity values were measured at 25° C. The particle size distribution of cured silicone powder was measured by dispersing the water-based silicone powder dispersion in methanol, and then carrying out measurements using a laser diffraction-based instrument for measuring particle size distributions, i.e., a Model LA-500 device manufactured by Horiba Seisakusho. In this regard, the following characteristics were determined: (i) the median size of the cured silicone powder, i.e., the particle size corresponding to 50% in the cumulative distribution, (ii) the content in volume % of the cured silicone powder with a particle size no greater than 10.0 μm, and (iii) the particle size of the cured silicone powder at 90 volume % cumulative distribution.

With respect to the volumetric particle size distribution of the catalyst, the water-based catalyst dispersion was measured using a submicron particle analyzer employing laser scattering, i.e., a Coulter Model N4 device manufactured by Coulter Electronics. The device was used to determine the average particle size of the catalyst, and the content, i.e., the volume % of the catalyst with a particle size no greater than 1 μm.

The cure status of the silicone composition was determined by adding 5 g ethanol to 2 g of the water-based dispersion of the silicone composition. In this test, cured silicone powder separated when the silicone composition had cured at the point of ethanol addition, while the silicone composition separated when the silicone composition had not cured at the point of ethanol addition.

Reference Example 1

A water-based silicone composition dispersion was prepared as described below, and it was used in other of the examples.

561.4 g of a dimethylvinylsiloxy-endblocked dimethylpolysiloxane with a viscosity of 400 centistoke, and 38.6 g of a trimethylsiloxy-endblocked dimethylsiloxane-methylhydrogensiloxane copolymer with a viscosity of 50 centistoke, in which the molar ratio of silicon-bonded hydrogen in the copolymer to vinyl in the dimethylpolysiloxane was 1.1, were placed in a one L beaker and mixed with a blade stirrer to homogeneity. An aqueous surfactant solution of 2.4 g of a nonylphenyl polyether surfactant in which the moles of ethylene oxide addition were 9.5, dissolved in 120 g of ion-exchanged water, was added to the beaker with stirring. The resulting water-based dispersion was emulsified in a colloid mill to provide a water-based silicone composition dispersion. The water-based silicone composition dispersion was transferred to a two L beaker, 460 g of ion-exchanged water was added, and the water-based silicone composition dispersion was stirred for 30 minutes with a motor stirrer to homogeneity.

Reference Example 2
Preparation of Catalyst (A)

1 g of a solution containing platinum-1,3-divinyl-1,1,3,3-tetramethyldisiloxane complex in isopropyl alcohol and 1,3-divinyl-1,1,3,3-tetramethyldisiloxane, was homogeneously dispersed in 97 g of ion-exchanged water and 8 g of a polyoxyethylene nonylphenyl ether surfactant in which the moles of ethylene oxide addition were 9.5, to provide a water-based catalyst dispersion. The water-based catalyst dispersion had an average particle size in its volumetric particle size distribution of 0.25 μm, and contained 95 weight % of the catalyst with a particle size of one micron or less in the volumetric particle size distribution.

Reference Example 3
Preparation of Catalyst (B)

1 g of a 1,3-divinyl-1,1,3,3-tetramethyldisiloxane solution of platinum-1,3-divinyl-1,1,3,3-tetramethyldisiloxane complex was homogeneously dispersed in 97 g of ion-exchanged water and 8 g of a polyoxyethylene nonylphenyl ether surfactant in which the moles of ethylene oxide addition were 9.5, to provide a water-based catalyst dispersion having an average particle size in its volumetric particle size distribution of 0.25 μm. The water-based catalyst dispersion contained 79 weight % of the catalyst which had a particle size of one micron or less in the volumetric particle size distribution.

Reference Example 4
Preparation of Catalyst (C)

1 g of a solution of platinum-1,3-divinyl-1,1,3,3-tetramethyldisiloxane complex in dimethylvinylsiloxy-endblocked dimethylsiloxane oligomer and 1,3-divinyl-1,1,3,3-tetramethyldisiloxane was homogeneously dispersed in 97 g of ion-exchanged water and 8 g of a polyoxyethylene nonylphenyl ether surfactant in which the moles of ethylene oxide addition were 9.5, to provide a water-based catalyst dispersion. The water-based catalyst dispersion had an average particle size in its volumetric particle size distribution of 0.8 μm, and it contained 44 weight % of the catalyst with a particle size of one micron or less in the volumetric particle size distribution.

Reference Example 5
Preparation of Catalyst (D)

1 g of a solution of platinum-1,3-divinyl-1,1,3,3-tetramethyldisiloxane complex in dimethylvinylsiloxy-endblocked dimethylsiloxane oligomer and 1,3-divinyl-1,1,3,3-tetramethyldisiloxane was homogeneously dispersed in 97 g of ion-exchanged water and 8 g of a polyoxyethylene nonylphenyl ether surfactant in which the moles of ethylene oxide addition were 9.5, to provide a water-based catalyst dispersion having an average particle size in its volumetric particle size distribution of 1.3 μm. The water-based catalyst dispersion contained 17 weight % of the catalyst with a particle size of one micron or less in the volumetric particle size distribution.

Reference Example 6
Preparation of Catalyst (E)

An isopropyl alcohol solution of chloroplatinic acid was prepared as a catalyst.

Reference Example 7
Preparation of Catalyst (F)

3 g of a solution of platinum-1,3-divinyl-1,1,3,3-tetramethyldisiloxane complex in isopropyl alcohol and 1,3-divinyl-1,1,3,3-tetramethyldisiloxane was homogeneously dispersed in 6 g of a polyoxyethylene nonylphenyl ether surfactant in which the moles of ethylene oxide addition were 9.5, to provide a surfactant-based catalyst dispersion. When this surfactant-based catalyst dispersion was dispersed in water, the average particle size in the volumetric particle size distribution of catalyst in the resulting surfactant/water-based catalyst dispersion was 0.46 μm, and the content of the catalyst with a particle size of one micron or less in the volumetric particle size distribution was 66 weight %.

Examples 1 to 3 & Comparative Examples 1 and 2

Catalysts (A)–(E) were added to the water-based silicone composition dispersion prepared in Reference Example 1, in amounts sufficient to provide 16 ppm platinum metal as catalyst in the silicone composition. The cure rate of the silicone composition, and the volumetric particle size distribution of cured silicone powder were determined, and these results are shown in Table 1.

Comparative Example 3

561.4 g of a dimethylvinylsiloxy-endblocked dimethylpolysiloxane with a viscosity of 400 centistoke and 38.6 g of a trimethylsiloxy-endblocked dimethylsiloxanemethylhydrogensiloxane copolymer with a viscosity of 50 centistoke, in which the molar ratio of silicon-bonded hydrogen in the copolymer to vinyl in the dimethylpolysiloxane was 1.1, were placed in a one L beaker and mixed with a blade stirrer to homogeneity. The mixture was cooled to −10 to −5° C. A curable silicone composition was prepared by addition to the mixture of a catalyst in an amount sufficient to provide 16 ppm of platinum metal as catalyst in the curable silicone composition. The catalyst used in this comparative example was a solution of platinum-1,3-divinyl-1,1,3,3-tetramethyldisiloxane complex in 1,3-divinyl-1,1,3,3-tetramethyldisiloxane and dimethylvinylsiloxy-endblock dimethylsiloxane oligomer. The curable silicone composition was combined and stirred with an aqueous surfactant solution prepaired by dissolving 2.4 g of a nonylphenyl polyether surfactant in which the moles of ethylene oxide adition was 9.5, in 120 g of ion-exchanged water. The resulting water-based dispersion was homogenized in a colloid mill to provide a water-based dispersion containing the curable silicone compresion. The water-based dispersion was transferred to a two L breaker, 460 g of ion-exchanged water was added, and the dispersion was stirred for 30 minutes with a motor stirrer to homogeneity. The cure rate of the curable silicone composition was determined by bringing the water-based dispersion to 50° C. The volumetric particle size distribution of the cured silicone powder was also determined. The results are shown in Table 1.

We claim:

1. A process for preparing cured silicone powders comprising preparing a water-based dispersion of a silicone composition containing (i) an organopolysiloxane having at least two silicon-bonded alkenyl groups in each molecule, and (ii) an organopolysiloxane having at least two silicon-bonded hydrogen atoms in each molecule; the water-based dispersion being prepared by mixing organopolysiloxanes (i) and (ii) in water in the presence of a surfactant; adding a platinum-alkenylsiloxane complex catalyst to the water-based dispersion of organopolysiloxanes (i) and (ii); the catalyst being dispersed in the water-based dispersion of organopolysiloxanes (i) and (ii) as liquid particles with an average particle size of no greater than one micron, the platinum-alkenylsiloxane complex catalyst particles comprising at least 40 weight percent of the liquid particles of catalyst dispersed in the water-based dispersion of organopolysiloxanes (i) and (ii); curing the organopolysiloxanes at a temperature of 5 to 70° C.; and separating a cured silicone powder from the water-based dispersion.

2. A process according to claim 1 in which the catalyst is prepared by dissolving or dispersing it in a water-soluble

TABLE 1

|  | present invention | | | comparative examples | | |
|---|---|---|---|---|---|---|
|  | | | | Comparative | Comparative | Comparative |
|  | Example 1 | Example 2 | Example 3 | Example 1 | Example 2 | Example 3 |
| type of catalyst | (A) | (B) | (C) | (D) | (E) | — |
| cure time in minutes | | | | | | |
| at 25° C. | 5 | 12 | 23 | no cure even after standing for 12 hours | no cure even after standing for 12 hours | after |
| at 50° C. | 1 | 2 | 7 | no cure even after standing for 2 hours | no cure even after standing for 2 hours | 10 |
| median size in μm of the cured silicone powder | 3.5 | 4.3 | 4.0 | — | — | 5.8 |
| content in volume % of cured silicone powder with particle size of ≦10.0 μm | 99.1 | 98.5 | 99.0 | — | — | 81.3 |
| particle size in μm in the cured silicone powder at 90 volume % | 6.0 | 7.2 | 7.0 | — | — | 13.3 |

Example 4

Catalyst (F) prepared in Reference Example 7, was added to the water-based silicone composition dispersion prepared in Reference Example 1, in an amount sufficient to provide 16 ppm in the silicone composition of platinum metal as the catalyst this silicone composition cured after 6 minutes at 25° C., and it cured after 2 minutes at 50° C. Values were determined for the volumetric particle size distribution of the cured silicone powder product. Its median size was 3.8 μm; the content of the cured silicone powder with a particle size of ten micron or less was 98.7 volume % of the volumetric particle size distribution; and the particle size of the cured silicone powder at 90 volume % of the volumetric particle size distribution was 7.0 μm.

Therefore, it can be seen that the process of this invention produces a cured silicone powder of more uniform particle size in a highly productive manner.

Other variations may be made in compounds, compositions, and methods described herein without departing from the essential features of the invention. The embodiments of the invention specifically illustrated herein are exemplary only and not intended as limitations on their scope except as defined in the appended claims.

organic solvent, and introducing a solution or dispersion of the catalyst into water.

3. A process according to claim 2 in which the water-soluble organic solvent is selected from the group consisting of methanol, ethanol, n-propanol, isopropanol, tert-butanol, acetone, and methyl ethyl ketone.

4. A process according to claim 1 in which the catalyst is selected from the group consisting of a platinum-1,3-divinyl-1,1,3,3-tetramethyldisiloxane complex, a platinum-1,3-diallyl-1,1,3,3-tetramethyldisiloxane complex, a platinum-1,3-divinyl-1,3-dimethyl-1,3-diphenyldisiloxane complex, a platinum-1,3-divinyl-1,1,3,3-tetraphenyldisiloxane complex, and a platinum-1,3,5,7-tetramethyl-1,3,5,7-tetravinylcyclotetrasiloxane complex.

5. A process according to claim 4 in which the catalyst contains 1,3-divinyl-1,1,3,3-tetramethyldisiloxane, 1,3-diallyl-1,1,3,3-tetramethyldisiloxane, 1,3-divinyl-1,3-dimethyl-1,3-diphenyldisiloxane, 1,3-divinyl-1,1,3,3-tetraphenyldisiloxane, or 1,3,5,7-tetramethyl-1,3,5,7-tetravinylcyclotetrasiloxane.

* * * * *